United States Patent [19]
Grossmann et al.

[11] 3,818,199
[45] June 18, 1974

[54] METHOD AND APPARATUS FOR PROCESSING ERRORS IN A DATA PROCESSING UNIT

[76] Inventors: Gunter Grossmann, Paul-Klee-Strasse 40; Josef Huber, Plattlinger Strasse 57; Hans-Ulrich Moder, Littmannstrasse 3, all of 8 Munich 71; Bernhard Schaffer, Kemptener Strasse 63, 8 Munich 49; Ulrich Lenz, Hindelangstrasse 8, 8 Munich 71; Joachim Petersen, Aidenbachstrasse 103, 8 Munich 70; Jurgen Rabold, Forstenrieder-Allee 167, 8 Munich 71, all of Germany

[22] Filed: Sept. 29, 1972

[21] Appl. No.: 293,498

[30] Foreign Application Priority Data

Sept. 30, 1971 Germany.............................. 2148981

[52] U.S. Cl............................................ 235/153 AK
[51] Int. Cl............................................. G06f 11/04
[58] Field of Search................ 340/146.1 BE, 172.5; 235/153 AK, 153 AE

[56] References Cited

UNITED STATES PATENTS

| | | | |
|---|---|---|---|
| 3,409,877 | 11/1968 | Alterman et al. | 235/153 AK |
| 3,517,174 | 6/1970 | Ossfeldt | 235/153 AE |
| 3,575,589 | 4/1971 | Neema et al. | 235/153 AK |
| 3,609,704 | 9/1971 | Schurter | 235/153 AK |
| 3,654,603 | 4/1972 | Gunning et al. | 235/153 AE |
| 3,692,989 | 9/1972 | Kandiew | 235/153 AK |

*Primary Examiner*—Charles E. Atkinson
*Attorney, Agent, or Firm*—Schuyler, Birch, Swindler, McKie & Beckett

[57] ABSTRACT

A method and apparatus for controlling the functional states of system units of a modularly constructed program controlled data processing system are described. The system units are connected through standard interface connections. The system stores all the program required for its operation in a central storage. Defective system units are placed in a testing state and isolated from the rest of the system, which can remain operative. The functional states of the individual system units can be changed manually and/or controlled automatically by a program. The individual system units indicate their respective functional states to a central station comprising a digital register over the standard interface connections, and through a storage cycle. Upon the occurrence of a defective change in functional state of one or more of the system units, the central station produces signals which bring about, either directly or through a program, a response from the processing unit assigned to the combination of the changes in the functional states at the given time.

11 Claims, 7 Drawing Figures

PATENTED JUN 18 1974 3,818,199

SHEET 4 OF 7

PATENTED JUN 18 1974 3,818,199

METHOD AND APPARATUS FOR PROCESSING ERRORS IN A DATA PROCESSING UNIT

BACKGROUND OF THE INVENTION

The invention relates to a method and apparatus for controlling the functional states of system units of a modularly constructed, program controlled data processing system. The individual modules or system units are interconnected over standard interfaces, and the programs required for operation of the system are stored in a central storage. In particular, a system of this type is described wherein faulty system units can be placed in a testing state and isolated from the rest of the system, which will remain intact and operative.

In a program controlled data processing unit, which can be employed with particular advantage as a program controlled switching system, a number of system units are available as data processing units, in which program controlled processing cycles can be performed. The necessary programs and data are held in a central storage unit which, in turn, may be considered as a system unit. The processing units communicate with one another via the central storage unit. This is accomplished by causing a processing unit, in which a process is to be performed, to request storage cycles from the storage unit according to the tasks to be performed. An exchange of information with the central storage takes place through an allotted cycle. The request, as well as the allotment of storage cycles, occurs through a central control unit in the storage by which the cycle requests may be allotted to the requesting processing units, for example, according to the priorities of the tasks to be performed.

To increase the reliability of the processing units, it is common practice to provide multiple individual system units. Due to the interchangeability of the individual system units, this construction, known as the modular construction, offers the possibility of causing each of the other system units to perform the tasks of a malfunctioning unit. The multiple arrangement applies to the system units serving as processors, as well as those employed as storage units.

DESCRIPTION OF THE PRIOR ART

The principle of the aforementioned processing system will be explained in the FIG. 1 below, where, for clearer identification, only the system units indispensable for the operation of the processing system are illustrated, i.e., only those that are duplicated in modular construction. In addition, further single system units may be utilized in the processing unit, which, in case of a breakdown, would not inhibit the operation of the whole processing system.

Accordingly, the processing system in accordance with the invention comprises three types of system units: (1) the processing units VEI1 to VEIN or VEII1 to VEIIN wherein specific requests are handled; (2) the storage units SEI and SEII wherein are held the programs necessary for the operation of the processing and (3) the program control units PEI and PEII for executing the various data processing programs.

The duplicated system units of the modular construction are labeled I and II.

The individual processing units VEI1 and VEIN or VEIIi and VEIIN, and the program control units PEI and PEII, which may likewise be considered as processing units, are connected with the storage units SEI and SEII over the standard interfaces. Each of the two storage units has a connection with each processing and program control unit. Thus, each processing unit or, as the case may be, each program control unit carries two groups of cables, each group being connected with one of the two storage units. The storage units are described in greater detail in allowed commonly assigned U.S. application Ser. No. 61,692, filed Aug. 6, 1970.

Since each of the processing units has a direct connection with the storage units only, a processing unit can perform its operation only by having direct access to the central storage unit. This is also true for the traffic of the individual processing units with one another. To assure appropriate cooperation within the system, control units are assigned to each of the storage units. Thus, in each storage unit there is available a storage and sequencing control SAS. If a processing unit desires data traffic with a storage unit, it directs a cycle request to the storage and sequencing control SAS in the storage unit.

The cycle allotment takes place by taking into account the various factors, e.g., taking into account the priority of the operating sequences to be performed in the processing units through the cooperation of the program request control ABAS and the storage input/output control SEAS in the storage and sequencing control SAS. Details describing the cycle allotment and the control units mentioned are found, for example, in U.S. Pat. No. 3,711,835.

As pointed out hereinabove, if a system unit breaks down, its task is taken over by a second identical system unit. To accomplish this, all the data and the programs necessary for operating the processing units must be contained in duplicate in either storage unit. Only thus can it be ensured that the rest of the system continued its operation correctly. Therefore, prior to reactivating a repaired or previously disabled storage unit, the storage unit to be reactivated must first be updated with the information retained in the storage unit operating at the moment of reactivation.

To further increase the dependability of a storage unit, it is divided into various memory banks SBI1 to SBIM or SBII1 to SBIIM. If an error occurs which influences a storage unit only locally, e.g., making only one memory bank appear faulty, it suffices to disable the faulty memory bank, while the part of the storage unit that remains intact continues to operate and is thus available for processing cycle requests.

As mentioned hereinabove, the processing system is modularly constructed. It has proved to be of great advantage to construct the system units so that they may be considered as interchangeable breakdown units. However, this results in a number of problems with respect to the operation of the whole system. For example, a faulty system unit must be switched out of the system, and the system unit taking over its tasks must be connected without interruption. After the faulty system unit has been repaired, it must, again without interruption, be connected to the system. If the system unit is a storage unit, there is, moreover, the problem that the faulty system unit must be updated within a short period.

To handle defective units it has been proposed to place defective system units in a testing system, so that they can no longer influence the part of the system that remains intact, and the system may be employed to test the defective units. However, there are also cases where, for example, a single error causes the breakdown of two similar system units, e.g., two program control units PE or storage units SE. Such an error would unduly cause a total breakdown of the whole system until corrected by manual intervention.

OBJECTS OF THE INVENTION

An object of the invention is to provide a method and apparatus for coping optimally with all possible cases of error in the individual system units, or in the cooperation thereof, by coordinating the various functional states of the individual system units. Accordingly, the effects of errors shall, as far as possible, be limited locally and in time. The causes leading to the error shall be recognized rapidly so as to enable the immediate repair of a faulty system unit. Particularly, a complete breakdown of the entire system shall be prevented where an error has the effect of rendering two similar system units, e.g., two program control units or storage units, inoperable (e.g., which are in the testing or failure state).

SUMMARY OF THE INVENTION

According to the invention a response is brought about in the system adapted to the various combinations of functional states of the individual system units and is characterized in that the functional states of the individual system units, e.g., operating state, testing state, malfunction state, parallel operation state and reactivating state can be adjusted manually and/or controlled automatically by program. The individual system units signal their respective functional states to a central station directly via the standard interfaces or in each case via a storage cycle for storage therein. Upon the occurrence of a faulty change in functional state of one or more system units, due to the change in functional state indicated in the central state, signals are generated by a control circuit which bring about, either directly or by program through previous evaluation of the contents of the central station, a response by the processing unit assigned to the combination of the changes in the functional states at a given time.

If a defective system is in the testing state, it is necessary to also place in the testing state one or more properly operating system units having the task of diagnosing the faulty system unit, since system units having different functional states cannot communicate with one another. This requirement has the disadvantage that an operational diagnosing unit, which is in the testing state, is not available for operating the remainder of the system during the diagnostic period. To overcome this disadvantage, a further development of the invention places the diagnosing unit, preferably the program control unit, in a functional state which simulates the testing state. Thus, a system unit which is in such a functional state is capable of communicating with units in the testing state, as well as with units in the operating state.

A suitable circuit arrangement which may be employed to great advantage to operate according to the invention is characterized by the fact that a central register is available as a central station for the functional states of the individual system units. In the central station a bit is strictly assigned to each functional state and to each error information of the individual system units. The central register is connected with the individual system units by signal lines over which the functional states are signalled from the system units to the central register. It is further characterized by means which also enable the setting of the bits representing the functional state in the central register by a control unit, e.g., the program control unit, so that signals are transmitted to the individual system units from the central register, and these signals bring about a switching of the system unit concerned to the desired functional state. Control units are connected to the central register which cause a response in the total system corresponding to the combination of the functional states of the individual system units at a given time.

In a further advantageous development of the invention, means are provided in the control units connected to the central register for causing an automatic restart of the whole system if a certain category of errors occurs preventing further significant operation of the system. This automatic restart occurs, for example, if the two storage units and/or the two program control units break down, and thus, the programs necessary for the operation thereof are no longer available for the processing units.

BRIEF DESCRIPTION OF THE DRAWINGS

For a better comprehension of the above-indicated features of the invention and other features which will hereinafter appear, reference may be had to the detailed description given hereinbelow and the accompanying drawings in which preferred structural embodiments incorporating the principles of the present invention are shown by way of illustrative example only.

DETAILED DESCRIPTION OF THE DRAWINGS

Figure 1:
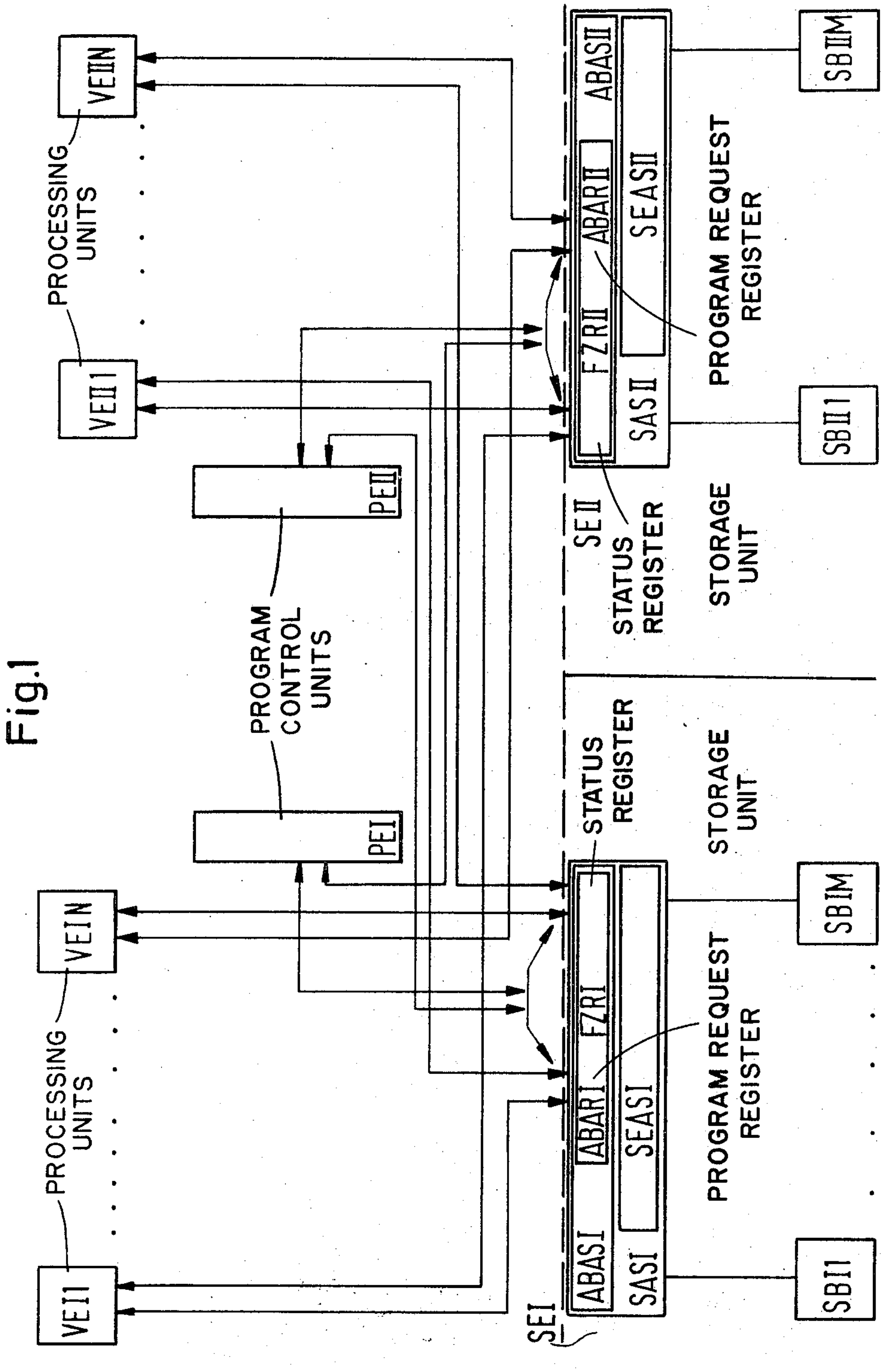
FIG. 1 is a block-schematic diagram of a data processing system which shows the entire construction of a modular processing system, and upon which the method of the invention can be performed.
Figure 2:
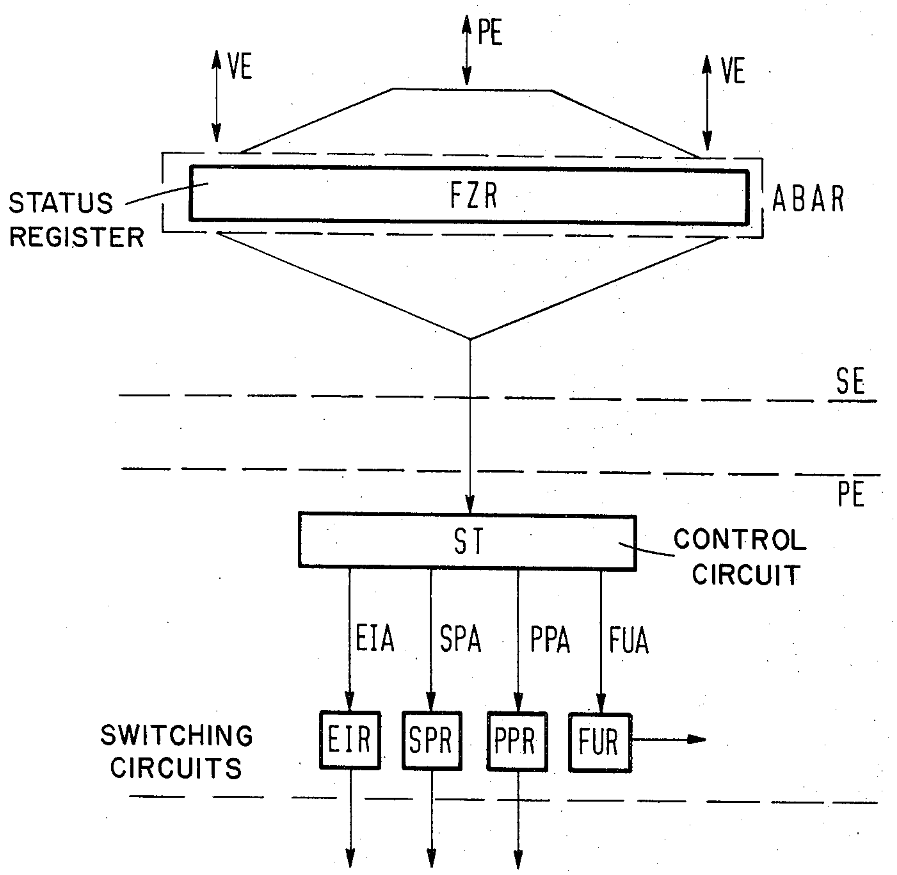
FIG. 2 diagrammatically illustrates the cooperation of the central station for the function states of the individual system units with the whole processing system.

FIG. 1 illustrates the mode of operation of the method in accordance with the invention within the total processing system. As indicated hereinabove, the system is known and accordingly, its individual components are described only as necessary to an understanding of the invention. In the individual system units and particularly at a central point, e.g., in the storage unit, devices are provided which monitor the sequences of operations of the individual system units and of the whole system, and activate control units, if errors occur. These devices localize the sources of the errors and isolate the same from the rest of the system. In this connection, the function state register FZR in the storage unit SE described with the aid of FIG. 2 is of particular importance.

According to the invention, the above monitoring and error-treating units place the individual system units in function states which are provided in response to an error that has occurred. For example, a processing unit VE which has detected an error is shifted from the normal operating state to the testing state, so as to enable automatic testing of this processor by another system unit, e.g., the program control unit PE. Likewise, a corresponding response takes place in the total system if a change occurs in the function state of a system unit, for example, to see to it that another system unit checks a defective unit and that the tasks of the faulty unit are taken over by another intact and operating system unit.

To simplify the cooperation of the individual system units in the event of an error, certain function states are defined for each system unit and, if necessary, also for parts of system units. In this case, all system units may assume the function states: operating state, testing state and failure state. The normal failure-free operation of a system unit is to be considered as the operating state. A system unit is placed in the testing state, if it is to be diagnosed as a result of an error message without influencing the rest of the system that remains intact. Finally, the failure state is defined as the condition where a system unit can no longer communicate with other system units which are in working order, for example, when the two standard interfaces of a processing unit are completely inhibited. Generally, it may be stated that the system units can communicate with one another, if they are in the same function state.

Aside from these function states, which are common to all system units, certain system units may assume additional function states of their own, and these states are conditioned by the task and the particular nature of the system units. For example, the storage unit may be in a function state that involves reactivating. This function state is provided if a storage unit is reconnected to the total system, for example, for repair. To accomplish this, it is necessary to provide a specific state for the storage unit during a given period; namely, the reactivating state, in which the information content of the storage unit is updated to the current state, or placed in the state of the second storage unit. Furthermore, the program control unit may assume the function state involving simulation of the testing state. Since normally the program control unit has, inter alia, the task of diagnosing faulty system units, it would be placed in the testing state whenever other units are to be diagnosed and, thus, are not available for the rest of the system that remains operative. However, since the program control unit controls the execution of the operating programs in the individual processors, in such a case the remainder of the system would be free of error but no longer in working order, unless one could switch to the second program control unit. There is a risk, however, that the second unit could be the faulty unit to be diagnosed. This could result in a considerable and detrimental effect on the availability of the total system. For this reason, means are provided in the program control unit for the purpose of simulating the testing state, i.e., during this state the program control unit can at the same time communicate with system units which are in the testing state and/or operating state.

The coordination of the function states of the individual system units takes place from a central point; namely, from the central units for processing errors. These central units are, therefore, of great importance for the working organization of the total processing system. In the embodiment discussed herein, these error-processing central units are provided in the storage unit SE and in the program control unit PE. In this connection, a function state register FZR in the storage unit SE, registers and controls the function states of the individual system units. In the embodiment discussed herein this function state register FZR is disposed within the program request register ABAR, which is itself of known construction and which registers the respective program requests of the individual processing units.

The construction of and the cooperation of the central registration center for the function states of the individual system units, i.e., of the function state register FZR, with the total processing system will now be described with the aid of FIG. 2.

FIG. 2 shows the function state register FZR and the control circuit ST connected thereafter. The function state register FZR is disposed in the program request register ABAR and, thus, in the control units of the storage unit. The control circuit ST, connected to the function state register FZR, as well as the following switching circuits which are referred to as operation routines EIR, SPR, and FUR, are located in the program control unit PE. The latter switching circuits are described in greater detail hereinbelow. The function state register FZR and the individual processing units VE, including the program control unit PE, are each connected to the storage unit over the standard interfaces of the processing units. Signal traffic in both directions is possible over these standard interfaces, i.e., from the processing units VE to the function state register FZR and vice versa. It is to be noted that for reasons of easier explanation the devices in FIG. 2 are shown as single devices. Due to the modular construction of the total system, these devices, as well as the system units containing the same, i.e., the storage and program control units, are duplicated.

In the function status register FZR are stored all function states which may be assumed by the individual system units, i.e., the function states: operating state, failure state, testing state, reactivating state and simulation of the testing state. For reasons of standardization, there is the possibility of storing outside of register FZR those function states which are only assumed by one or a part of a system unit; for example, such information can be stored, in each of the system units themselves. Thus, for example, in the embodiment shown herein, the function state involving simulation of the testing state, which may only be assumed by the program control unit, is stored in the program control unit PE itself. Furthermore, in the status register FZR the aforementioned function states are not only stored in the form of function state bits, but each processing unit also has the possibility of setting in register FZR an error bit strictly assigned to the processing unit concerned. Likewise, if two system units operate in parallel, certain parallel operation bits are set in the status register. There is further the possibility that certain parts of system units, e.g., the memory banks SB or the control units in the storage unit, store their function states in the status register FZR, practically as independent system units. Moreover, the individual system units are capable of signalling to the status register FZR errors of their own or of other system units recognized in their monitoring circuits, storing them therein, and in conjunction therewith, influencing the function state bits of their own or of other system units.

A different procedure may be followed with the arrangement of the bits in the status register FZR. A specific area of the status register FZR may be assigned to a system unit, so that this specific register area is employed to accept all function state bits of the system unit assigned to it. It is also possible, as employed in the embodiment under consideration, to assign a specific area of the status register FZR to a function state of all or several system units. In arranging the function state bits in the register FZR care should be exercised that each function state bit be strictly assigned to only one function state of a particular system unit.

The setting of the function bits may take place in two ways. The processing units VE may signal their respective function states to the storage unit. Through such signalling the corresponding bit may be set directly in the status register FZR, but the latter may also be set in binary code by a storage cycle requested by a processing unit VE.

If a processing unit VE signals its function state to the status register FZR and if, consequently, the corresponding bit is set in the register FZR, the register FZR performs only a passive registering function. However, the status register FZR is by no means limited simply to registering operations. Rather, it is possible to set in register FZR any desired function state bits through program instructions via the program control unit PE or manually via the control panel. The result is that the individual system units automatically assume the function state corresponding to its function state bit in the status register FZR. Hence, the latter has also the function of a central switching station, from which all function states of the individual system units may be controlled.

If the content of a bit location is altered in the status register FZR, which may be conditioned not only by the change in the processor state of a system unit, but also by an error, this change of content is signalled to all processing units VE. This signalling, however, is received and evaluated only by those processing units having appropriate devices for causing the whole system to respond to the change in content in question of the status register. In the example mentioned hereinabove, the signalling of a function state in register FZR is received and evaluated only by the program control unit. To accomplish this, the program control unit PE is equipped with a control circuit ST, which causes the whole system to respond assigned to the combination concerned of the changes in function state indicated in the register FZR. The signalling of the changes in function state may take place by static, as well as by dynamic signals.

Basically, it is possible to evaluate status register FZR by program, for which a connection is required; this is referred to herein as a fault interrupt routine FUR. Depending on the priority of the error which has occurred, the routine FUR can cause an interruption of the currently running program and trigger an error program. However, combinations of function states in the total system may occur, e.g., the transition of the two program control units PE or of the two storage units SE to the testing or failure state. Such an occurrence cannot be followed by a reaction of the total system by program. To be able to significantly cope with such combinations of function states, the invention provides additional circuits connected to the control circuit ST and, like the latter, disposed in the program control unit PE.

The aforementioned additional circuits facilitate the performance of the following routines: the start routine EIR, the storage unit test routine SPR, the program control unit test routine PPR, as well as the aforementioned fault interrupt routine FUR. These will be described hereinafter with respect to their functions and cooperation with the total system, reference being made to the FIGS. 3, 4, 5 and 6.

It should first be pointed out that, because of the identity of the two program control units, the switch routines shown in FIGS. 3, 4, 5 and 6 are in each case illustrated in the first program control unit PEI only and are not fully shown in the second program control unit PEII.

Figure 3:
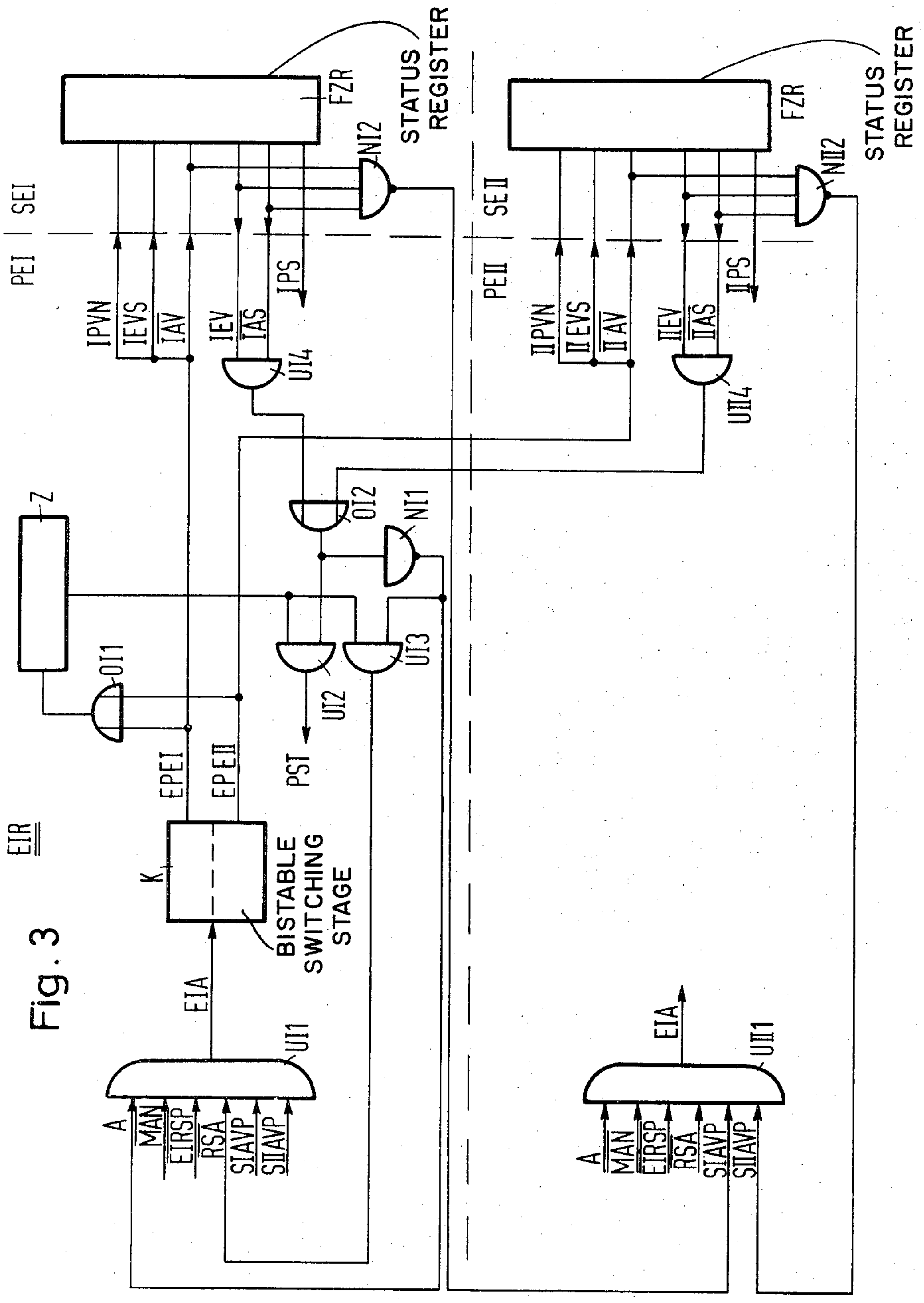
FIG. 3 is a schematic diagram showing control units which counter a total breakdown of the processing system with an automatic reactivation.

FIG. 3 shows the start routine EIR switching circuit which is triggered if, due to particular conditions, the total system is no longer capable of functioning and breaks down as a result. Thus, the start routine EIR is used to prevent the system from breaking down completely until corrected by manual intervention.

As indicated hereinabove, certain conditions are required in the total system to initiate the start routine EIR, i.e., to produce the signal EIA. These conditions, which will be discussed hereinafter and which produce signals, are conjunctively interconnected. First and foremost, it is necessary that the program control unit PE, which triggers the start routine, itself be in the failure state (signal A). Further, the program control unit PE must be in the automatic and not in the manual mode of operation (signal $\overline{MAN}$). Since the start routine EIR has its own inhibiting switch in the control panel of the program control unit PE by which, in cases or repair, the start routine may be disabled and, thus, a disturbing automatic switching into circuit of the total system may be prevented, the start routine EIR cannot be disabled by this inhibiting switch (signal $\overline{EIRSP}$). Likewise, a resetting of the sequencing control of the program control unit PE, e.g., due to an error, may not take place (signal $\overline{RSA}$). Finally, to produce the signal EIA, the second parallel program control unit PEII must also be in the failure state, with the two storage control units SEI and SEII signalling that the second program control unit PEII is in the failure state (signals SIAVP and SIIAVP). This is necessary, since otherwise the second program control unit PEII could perhaps maintain the operation of the total system.

If all of the aforementioned signals are present at AND gate VI1, the start routine EIR is initiated by the signal EIA. This signal sets (depending on the previous state) or resets bistable switching stage K. Consequently, the output EPEI or EPEII of the switching stage K is set to logic 1. If, by way of example, the output EPEI is set to logic 1, the signals IEVS and $\overline{IAV}$ are transmitted to the status register FZR in the storage unit SEI. These signals cause the deletion of the failure bit and the setting of a start bit of the program control in register FZR. The start bit of the program control PEI is to be set by the signal IEVS and the failure bit of the program control unit PEI is to be taken back by the signal $\overline{IAV}$. Furthermore, the setting of the output EPEI of the switching stage K causes the transmission of the signal IPVN to the storage unit SEI, i.e., the program control unit PEI simulates the testing state with respect to the storage unit SEI. If the storage unit SEI reacts to the signals IEVS and $\overline{IAV}$ free of faults, it subsequently applies the signals IEV and $\overline{IAS}$, to the gate U14. The signal IEV signifies that the disabling of the switching paths between the program control unit PEI and the storage unit SEI has been annulled, and a connection between these two units has been re-established. At the same time, however, it means that the storage unit SEI, as a result of the signal IAS, passes from the failure state to the testing state (signal IPS). The signals IEV and $\overline{IAS}$ generate a logic 1 via the gate U14 and 012 at an input of the gate U12. The other input of this gate is connected with the output of a counter Z, of conventional construction, which is started by the output signals of the bistable stage K via an OR gate OI1. The counter Z applies a signal to its output whenever a response of the storage unit SEI or SEII may be expected as a result of the signals EPEI or EPEII. If this happens, a diagnostic program is started by the output signal PST of the gate U12, but if there is no logic 1 at the output of the gate OI2, which amounts to a disturbed response from the storage SEI, the signal A is generated via the gate NI1 and transmitted to the gate UI1. This means that the program control unit PEI is furthermore in the failure state. In this case, the signal RSA is transmitted to the gate UI1 via the gate UI3, upon operation of the counter Z. This signal causes the sequencing control (not shown) of the program control unit PEI to be reset and until then the start routine EIR of the program control unit PEI is prevented from starting anew.

If the output EPEII of the switching stage K is set upon the start of the start routine, the same operations are performed as previously described with respect to the storage unit SEI. If the storage unit SEI or SEII responds in good order to the start routine EIR, this is signalled to the parallel start routine EIR in the program control unit PEII via the gate NI2 or NII2 in the form of the signals SIAVP or SIIAVP. Thus, by way of example, if the start routine in the program control unit PEI has established a connection between this program control unit and the storage unit SEI, a logic 0 is applied to the output of gate NI2. This means that the signal SIAVP and, consequently, also the signal EIA in the program control unit PEII also becomes logic 0.

In theory, it is also conceivable that the two program control units PE communicate at the same time with a storage unit SE because of the start routine EIR. After a connection has been established with a storage unit SE, the now connected program control unit PE begins a start program from a positively demined data cell of a protected storage area. This start program must take into account the connection combinations between the program control units and the storage units. Since the start routine EIR places the switched-in storage units SE in the testing state, but the program control unit is placed in the operating state by the signal EV and is therefore not capable of diagnosing the storage units which are in the testing state, the function state "simulation of the testing state" is provided in this case for the program control unit PE. For example, the first storage unit SEI is first diagnosed by the program control unit. If this first storage unit inhibits traffic with the program control unit, the program control unit is so influenced by special devices that it now seeks to establish a connection with the second storage unit by simulating the testing state with respect to this storage unit.

If the program control unit PE is in the operating state and if during the operation the two storage units SE are brought into the testing state, e.g., because of an error, the program control unit cannot communicate with the storage units. In order to maintain the operation of the system in this case, a storage test routine SPR is provided under these conditions placing the program control unit, as well as the start routine EIR in the function state "simulation of the testing state."

Figure 4:
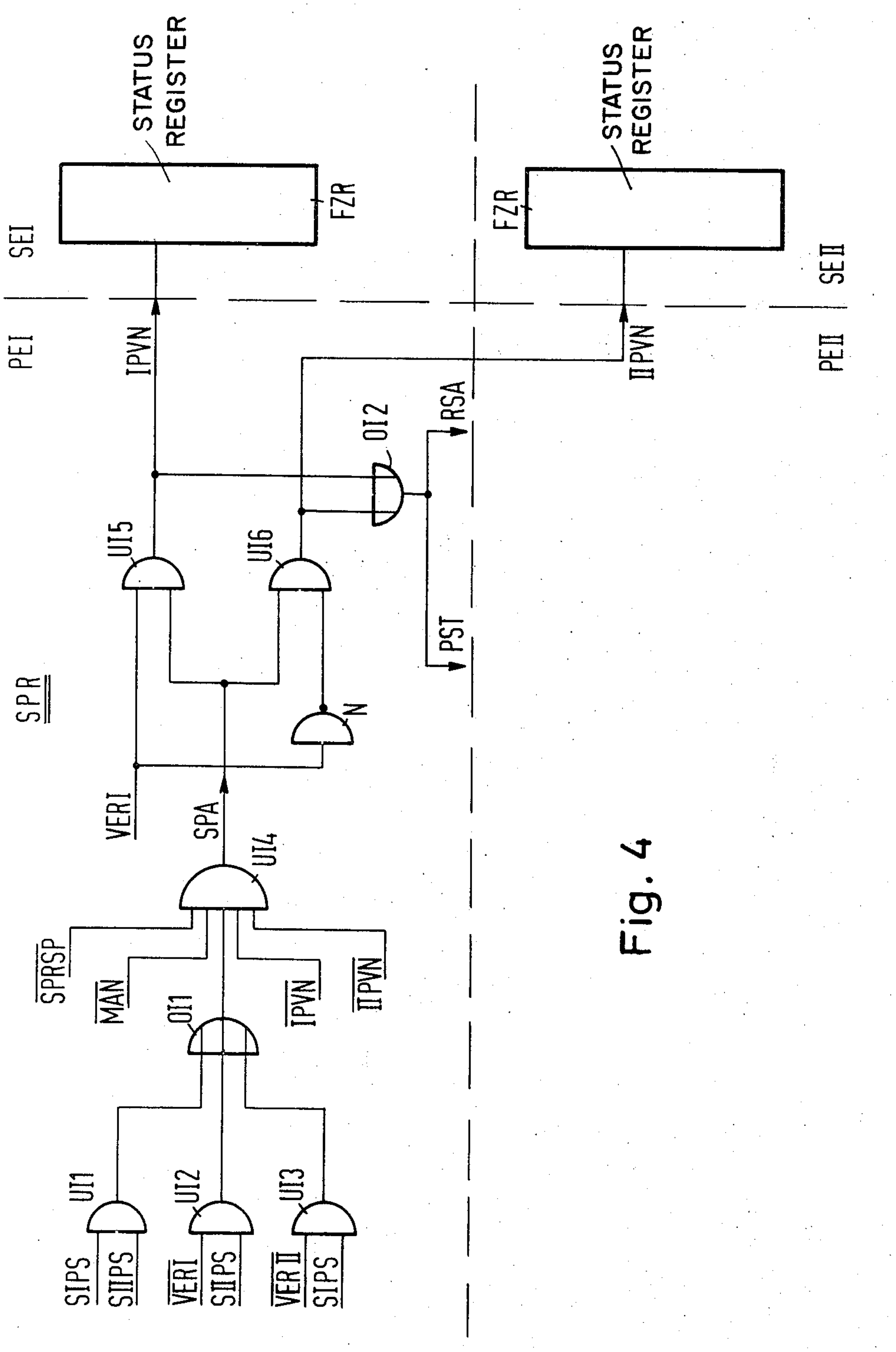
FIG. 4 is a schematic diagram of a special circuit to test the storage units.

This storage test routine SPR is described in detail in conjunction with FIG. 4. The storage test routine SPR is started if the following conditions are met and, therefore, the signal SPA produced. As mentioned hereinabove, the two storage units SE must be in the testing state (signals SIPS and SIIPS) or the storage unit SEII must be in the testing state (signal SIIPS) and the connection to the storage unit SEI must be completely inhibited (signal $\overline{VERI}$), or the storage unit SEI is in the testing state (signal SIPS) and the connection to the storage units SEII is inhibited (signal $\overline{VERII}$). If one or more of these pairs of conditions are met, the signal SPA is generated, assuming the program control unit is not operated manually (signal $\overline{MAN}$).

If the storage test routine has been triggered, the sequencing controls of the program control unit PE are reset (signal RSA) and the program control unit is placed in the function state "simulation of the testing state." Thus, for example, the program control unit sends the signal PVN to the storage unit SEI and the signal $\overline{PVN}$ to the storage unit SEII, i.e., the testing state is simulated with respect to the storage unit SEI, but not with respect to the storage unit SEII.

The storage test routine SPR is initiated by the signal SPA. This signal is generated in response to the input signal of the gate AND These are the signals $\overline{SPRSP}$, $\overline{MAN}$, the output signal of gate OI1, the signals $\overline{IPVN}$ and $\overline{IIPVN}$. The signal $\overline{SPRSP}$ means that the inhibiting switch of the storage test routine SPR must not be in the disabling state. The signal $\overline{MAN}$ signifies that the entire program control unit PEI is not in the manual operation state. The signals $\overline{IPVN}$ and $\overline{IIPVN}$ mean that the program control unit PEI at the moment does not simulate the testing state either with respect to the storage unit SEI or with respect to the parallel storage unit SEII. The gates UI1, UI2, and UI3 in the left hand portion of FIG. 4 are, as well, AND gates.

If the signal SPA is generated at the output of the gate UI4, and if there is a connection between the program control unit PEI and the storage unit SEI (equivalent to the signal VERI), the signal IPVN is transmitted to the storage unit SEI via the gate UI5. In this case, the program control unit PEI subsequently simulates the testing stage with respect to the storage unit SEI. If, however, there is no connection between the program control unit PEI and the storage unit SEI (equivalent to the signal VERI = O), the signal IIPVN is sent to the storage unit SEII via the gate UI6, i.e., the testing state is simulated with respect to the latter storage unit. The signal IPVN or IIPVN generate the signals PST (start of the diagnostic program) at the output of the gate IO2 and RSA (resetting of sequencing control of program control unit PEI).

A further test routine according to the invention is required if the two program control units PE are placed in the testing state, since in this case no program control unit PE can perform storage cycles. This combination of function states occurs, for example, if two program control units run synchronously and transmit non-identical information to the storage unit and, thus, engage a monitoring circuit which places the two program control units in the testing state.

Figure 5:
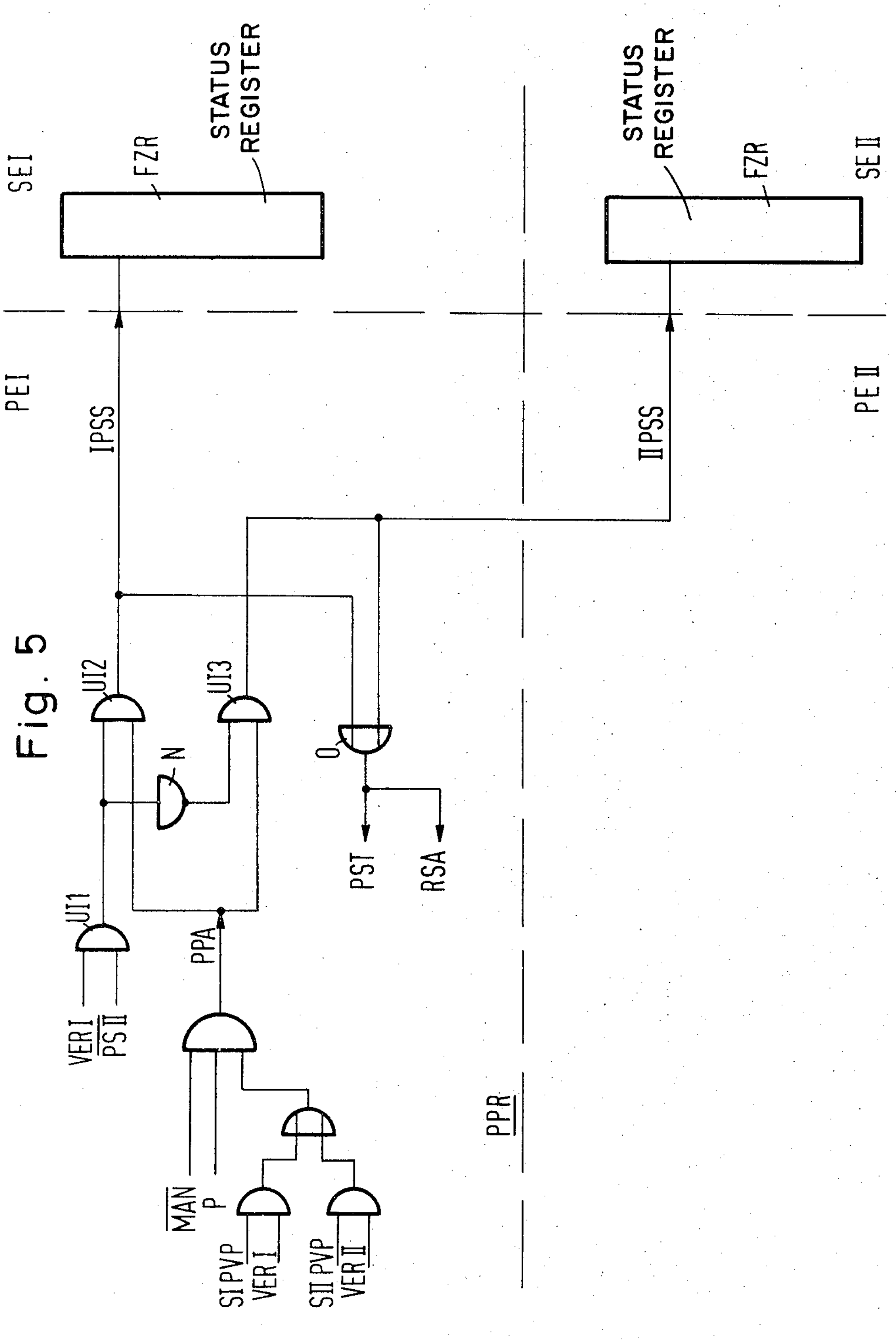
FIG. 5 is a schematic diagram of particular devices for testing the program control units.

This program control test routine PPR is shown in FIG. 5. The routine PPR is started if the signal PPA is produced. For this purpose, the following conditions in the form of signals are required. The program control unit must be in the testing state and in the automatic mode of operation (signals P and $\overline{MAN}$). Furthermore, it is necessary that the second program control unit PEII also be in the testing state. This condition is signalled in that either the signal SIPVP is transmitted via the first standard interface connection, whose presence is indicated by the signal VERI, or the signal SIIPVP is transmitted via the second standard interface connection, whose presence is indicated by the signal VERII. If the signal PPA appears and the routine PPR is thus started, the latter resets the sequencing controls of the program control unit PE with the signal RSA and places one of the two storage units SE in the testing state with the signal IPSS or with the signal IIPSS, so as to enable the traffic between the program control unit, which is in the testing state, and a storage unit. At first, the test routine PPR, provided there exists a connection with the storage unit SEI (signal VERI) and the second storage unit SEII is not in the testing state (signal $\overline{IIPS}$). it, then, seeks to place the first storage unit SEI in the testing state (signal IPSS). If these conditions are not met, then the routine PPR sends the signal IIPSS, thus placing the second storage unit SEII in the testing state. After a storage unit SE has been placed in the testing state, the program control unit PE starts a test program from a specified location. The program control unit is diagnosed through this test program. In this connection, the test program is so designed that the program control unit PE is run on a stop instruction, if error functions are detected. If a program control unit runs on a stop instruction, it transmits the signal FVS (set error-bit-processing unit) to the status register FZR and, subsequently, in the other program control unit the test program is interrupted and an error program is accepted.

The program control test routine PPR is triggered by the signal PPA each time the signal PPA opens the gates UI2 and UI3. If there is a connection between the program control PEI and the storage unit SEI (signal VERI = 1) and, at the same time, the storage unit SEII is not in the testing state (signal $\overline{PSII}$), the signal IPSS is transmitted to the storage unit SEI over the gates UI1 and UI2, which places the storage unit in the testing state. However, if a logic signal 0 is applied to the output of gate UI1, the signal IIPSS is sent to the storage unit SEII via the gates N and UI3, this unit in the testing state is placed. Every time the signals PST and RSA are generated over the gate 0 in response to the signals IPSS and IIPSS, a diagnostic program is again started by the signal PST, and the signal RSA causes the resetting of the sequencing control of the program control unit.

If errors occur which do not result in initiating the routine described heretofore, e.g., if there is a faulty clock supply or power supply, or if there are cycle errors of the memory banks, then a fault interruption signal FU is sent from the storage unit to the program control units, and thus, a fault interrupt routine FUR is started in a program control unit.

Figure 6:
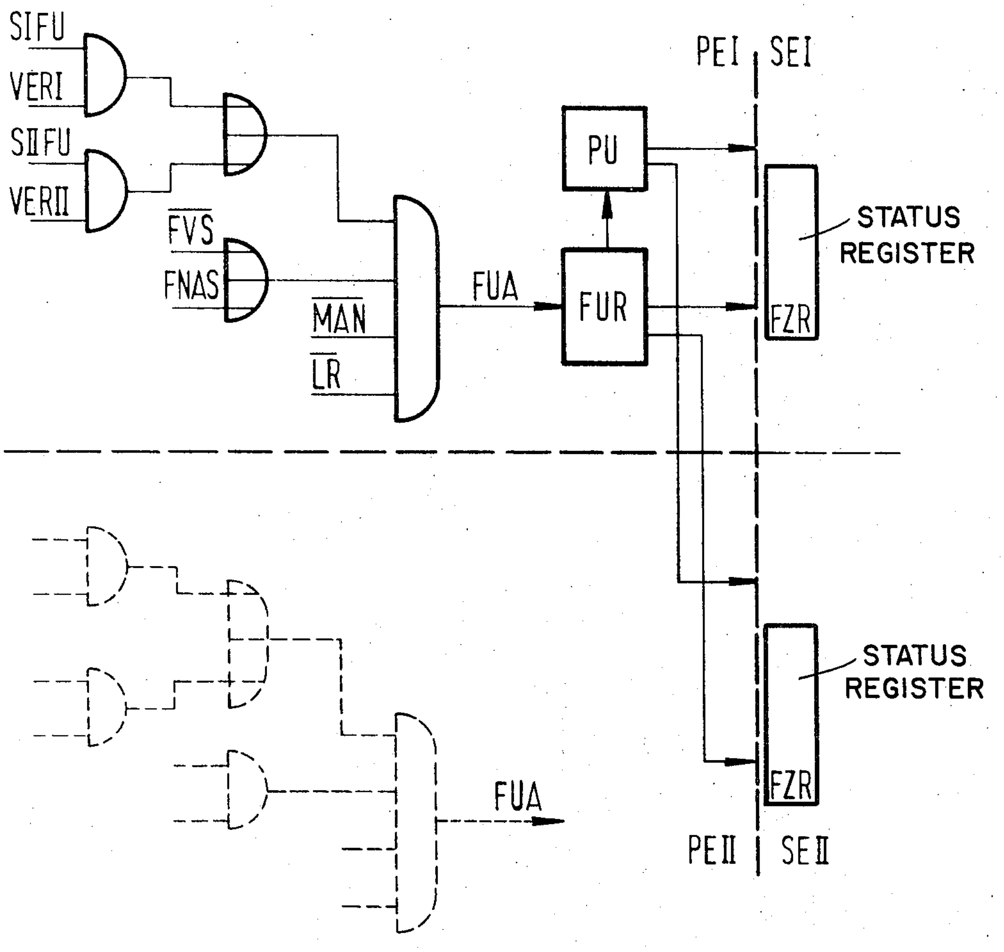
FIG. 6 is a schematic diagram of control units for coping with other errors which are not logged by the devices illustrated in FIGS. 3, 4 and 5.

FIG. 6 shows the conditions for starting the fault interrupt routine FUR and which response occurs thereafter. To start the fault interrupt routine FUR, the signal FUA must be present and the following conditions must be met. Upon receiving the signal FU, none of the other routines described heretofore must have been started (signal $\overline{LR}$). It is necessary that the program control unit not be in the manual mode of operation (signal $\overline{MAN}$). The program control unit itself must transmit the signal FVS, i.e., transmit a fault message to the storage unit (signal $\overline{FVS}$), except when the signal FVS is transmitted due to a blockage of the interface, thereby producing the signal FNAS at the same time. The first standard interface connection must be present (signal VERI). Also, the signal SIFU must be sent via the first standard interface or the second standard interface connection must not be inhibited (signal VERII), and the signal SIIFU must be sent via the second standard interface. If all these conditions are met, the fault interrupt routine FUR is stated by the signal FUA.

At first, the fault interrupt routine causes an interruption of the program PU, just started. To achieve this, the register contents of the program control unit necessary for the continuation of the program just started are stored in the storage unit. The program just started is not interrupted, if it is itself of a higher priority. Subsequently, an error program is accepted from a predetermined location. Through this error program, the state of the status register FZR is analyzed, and a response from the total system is brought about. This response is precisely assigned to the configuration, at a given time, of the function states of all the system units, i.e., to the content of the interrupt status register FZR at a given time. The fault interrupt routine FUR is particularly important for those system units which are not storage or program control units. Thus, a transition of these system units to the failure or testing state merely causes the start of the fault interrupt routine FUR.

The fault interrupt routine FUR, which is tripped by the signal FUA, causes a normal program interruption of the currently running program and the reacceptance of a diagnostic program. Such a program interruption is fully described in our patent application VPA 70/2193 USA Ser. No. 208,259.

Figure 7:
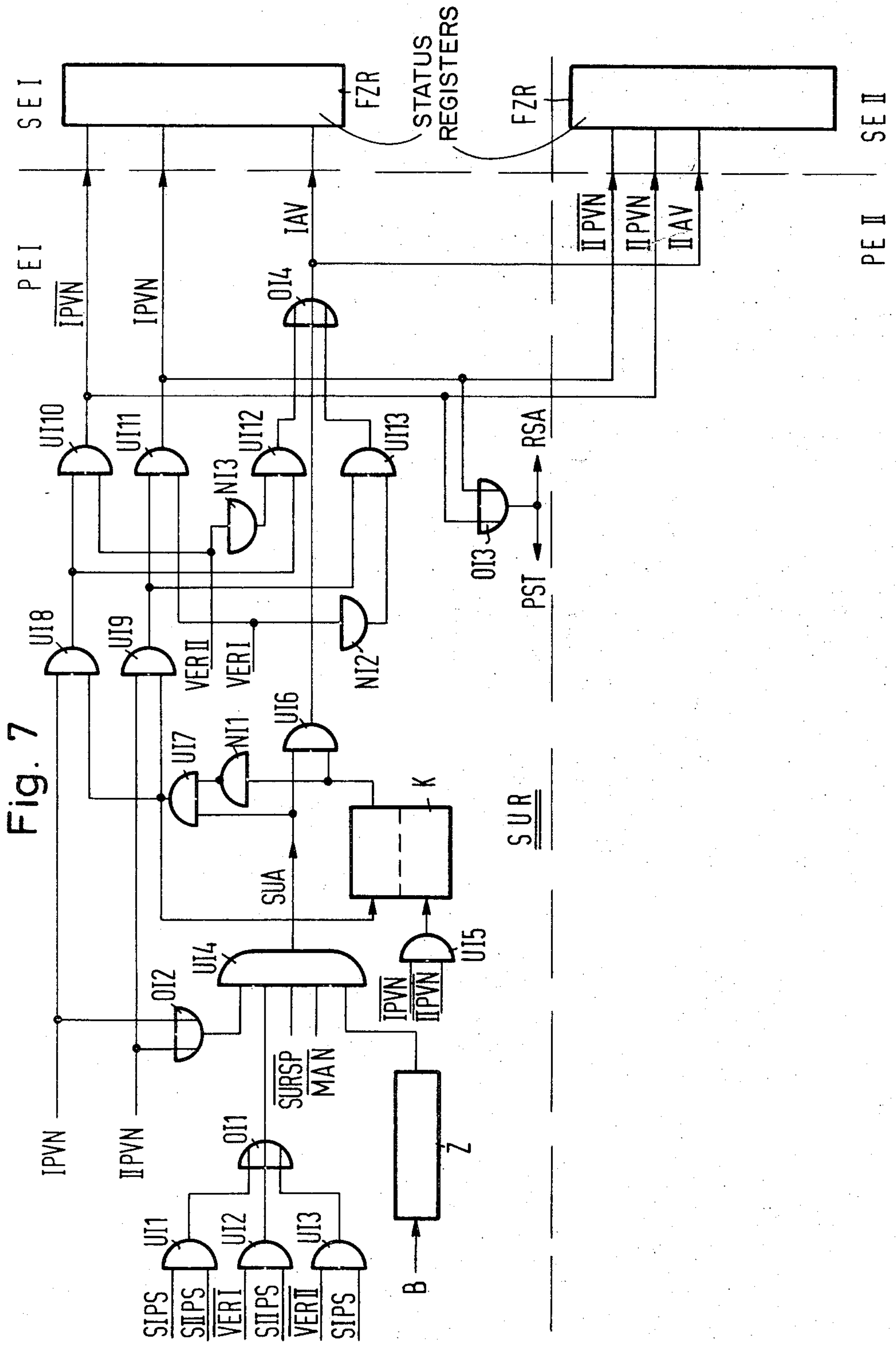
FIG. 7 is a schematic diagram of the switching circuitry for performing the storage change-over routine.

The storage change-over routine SUR described in FIG. 7 is important to both the start routine EIR and the storage test routine SPR for the reason that each time it is expected, as a result of the start routine EIR and the storage test routine SPR, that a program control unit PE assumes the function state "simulation of the testing state" with respect to a storage unit SE. If, by way of example, the program control unit PEI simulates the testing stated with respect to the storage unit SEI, a diagnostic program for the testing of the storage unit SEI is accepted as a result of the signal PST. If this diagnostic program cannot be run due to a fault in the storage unit SEI, the program control PEI is switched to the state "simulation of the testing state" with respect to the storage unit SEII. This switch of the function state "simulation of the testing state" with respect to one of the two storage units SE is caused by the storage change-over routine SUR.

The storage change-over routine SUR is initiated by the signal SUA. To generate the signal SUA, the following conditions must be met at the input of the gate UI4. The testing state must be simulated with respect to a storage unit (signal IPVN or IIPVN). A logic 1 must be applied to the output of the gate OI1, which means that either the two parallel storage units are in the testing state (signals SIPS and SIIPS) or the connection to the storage unit SEI does not exist, and at the same time, the storage unit SEII is in the testing state (signals $\overline{VERI}$ and $\overline{SIIPS}$), or the connection to the storage unit SEII does not exist. Simultaneously, the storage unit SEI must be in the testing state (signals $\overline{VERII}$ and SIPS). One of these conditions is always present because of the start routine EIR or the storage test routine SPR. Moreover, the inhibiting switch of the storage change-over routine must not be set and the program control unit PEI must not be in the manual operating mode (signals $\overline{SURSP}$ and $\overline{MAN}$). Finally, the output signal of a counter Z must be present, and this is reset as a result of any instruction B of the diagnostic program. Therefore, if the counter Z, at times, does not receive an instruction B, because of a fault of the diagnostic program, then the counter Z is not reset, and a signal is generated at its output.

If a logic signal 1 is applied to all the inputs of the gate UI4, then the signal SUA is, likewise equivalent to logic 1. Depending on the state of bistable stage K, the signal SUA is sent to the status register FZR of the storage unit SEI either via the gates UI6 and OI4, or to the gates UI8 and UI9 via the gate UI7. During this process, the bistable stage K stores the signal as to whether the storage change-over routine SUR immediately before that has already caused a change-over of the state "simulation of the testing state." Should this be the case and the bistable stage K is set, the program control unit PEI is placed in the failure state via the gate OI4 and the signal IAV. If this is not the case, and the bistable stage K is not set, the gate UI7 is opened via the output of the gate NI1, and each time a logic state 1 is sent to the gates UI8 and UI9, along with setting the bistable stage K.

If the testing state has been simulated by the program control unit PEI, e.g., with respect to the storage unit SEI, then the signal IPVN is equivalent to logic 1 and the signal IIPVN equivalent to logic 0. If, in this case, there is a connection between the program control unit PEI and the storage unit SEII (signal VERII = 1), the signal $\overline{IPVN}$ is sent to the storage unit SEI via the gate UI10 and the signal IIPVN to the storage unit SEII. This means that the testing state is now simulated with respect to the storage unit SEII, but if the connection between the program control unit PEI and the storage unit SEII is interrupted (signal VERII = 0), then the signal IAV is transmitted to the storage unit SEI via the gates NI3, UI12 and OI4. This places the program control unit PEI in the failure state.

The same procedure is followed, if, prior to the start of the storage change-over routine SUR, the program control unit PEI simulates the testing state with respect to the storage unit SEII. Consequently, the signal IIPVN (logic 1) is applied. If, in this case, there is a connection between the program control unit PEI and the storage unit SEI (signal VERI = 1), the signal $\overline{IPVN}$ is sent to the storage unit SEI via the gates II9 and UI11, and the signal IPVN to the storage unit SELL. This simulates the testing state with respect to the storage unit SEI. If the signal VERY = logic 0, then the signal IAV is sent to the storage unit SEI via the gates NI2, UI13 and 014 and, consequently, the program control unit PEI is also placed in the failure state. The signals PST and RSA are generated via the gate 013 in response to the output signals of the gates UI10 and UI11. During this process, the signal PSP causes the start of the diagnostic program, and the signal RSA the resetting of the sequencing control of the program control unit.

The principles of this invention have been described herein in terms of preferred embodiments which are intended only to be exemplary of those principles. The described embodiments might be modified or changed while still being within the scope of the invention as defined by the appended claims.

We claim:

1. A method for controlling the functional states of system units in a modularly constructed, program-controlled data processing system, which system units are connected over standard interface connections, said system having a storage unit for containing the programs required for the operation of the system and which is in communication with said system units, and wherein faulty system units may be placed in a testing state and isolated from the remainder of the system, which remains operative, the method comprising the steps of:

adjusting manually or controlling through a program the functional states of said system units, said functional states comprising an operating state, a testing state, a malfunction state, parallel operation state and a reactivating state, signalling the respective functional states of said individual system units to a status register, producing, upon occurrence of a defective change in functional state in one or more of said system units, in said status register a signal indicating said defect and causing a response in the processing unit assigned to the combination of changes in the functional states at a given time responsive to the defect indicating signal.

2. The method defined in claim 1 wherein certain of the signals indicating functional states are stored in corresponding system units rather than in said status register.

3. The method defined in claim 1 wherein said system units contain a counter system units running in parallel are synchronized in accordance with one of the following steps:

placing said system units in the failure state prior to the parallel operation and then commonly and concurrently switching said system units into circuit upon command, or loading a counter by a particular signal until the identity of the operating states of said system units is established and after loading of said counter, producing a switch signal for causing the initiation of said parallel operation.

4. The method defined in claim 1 comprising the additional step of establishing a functional state of "simulation of the testing state" wherein certain of said system units, preferably the program control unit, may communicate with others of said system units which are in the testing state and at the same time with others of said system units which are not in the testing state.

5. The method defined in claim 1 wherein a change in the functional states of said individual system units is indicated by said status register by production of a signal from a control circuit means connected to said status register.

6. The method defined in claim 1 wherein said system units contain means for monitoring the operations of others of said system units and comprising the additional steps of:

signalling said central station means from ones of said system units with information concerning the functional states of others of said system units and storing said information in said central station means, said central station means influencing the functional states of said system units in accordance with said stored information.

7. In a modularly constructed program controlled data processing system having individual system units including program control means interconnected over standard interface connections, said system having a storage unit for containing the programs required for its operation and in communication with said system units and wherein defective ones of said system units may be placed in a testing state and isolated from the remainder of said system, which remains operative, apparatus for controlling the functional states of said system units comprising:

central register means to which all of said system units are connected and wherein bit locations are assigned to each functional state of each of said system units, control circuit means connected to the output of said central register means for generating signals corresponding to the changes in functional states of said system units, said control circuits means having a plurality of outputs and switching circuit means connected to said plurality of outputs and having means responsive to outputs of said control circuit means for causing a response of said entire data processing system in accordance with the combinations of the changes in functional states at a given time.

8. The apparatus defined in claim 7 wherein said switching circuit means includes a start routine circuit means for automatically switching a storage means and a program control means in said system in case of a total breakdown of that system, thus switching said system back into operation.

9. The apparatus defined in claim 7 wherein said switching circuit means includes storage test routine switching means for placing at least one of the program control units in the "simulation of the testing state" functional state, if both of the storage units in the system have been placed in the testing state.

10. The apparatus defined in claim 7 wherein said switching circuit means includes program control test routine switching means for facilitating data traffic between the program control and the storage in said system, when program control means in the system have been placed in a testing state.

11. The apparatus defined in claim 7 wherein said switching circuit means includes fault interrupt switching means for, in the case of presence of error signals from the output of said control circuit means, which do not cause initiation of other portions of said switching circuit means, causing a program interruption of the program control means of said data processing system and thereby causing a response of said system in correspondence with the combination of functional states of said individual system units at the given time.

* * * * *